(12) United States Patent
Narita et al.

(10) Patent No.: US 8,017,766 B2
(45) Date of Patent: *Sep. 13, 2011

(54) METHODS FOR PREPARING ALKALI CELLULOSE AND CELLULOSE ETHER

(75) Inventors: Mitsuo Narita, Joetsu (JP); Atsushi Hatayama, Joetsu (JP); Hiroshi Umezawa, Joetsu (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/448,969

(22) Filed: Jun. 7, 2006

(65) Prior Publication Data

US 2006/0287518 A1 Dec. 21, 2006

(30) Foreign Application Priority Data

Jun. 16, 2005 (JP) ................................. 2005-176286

(51) Int. Cl.
*C08B 15/05* (2006.01)
*C08B 11/00* (2006.01)

(52) U.S. Cl. ......................................... 536/84; 536/101
(58) Field of Classification Search .................... 536/84, 536/101
See application file for complete search history.

(56) References Cited

U.S. PATENT DOCUMENTS

| | | | |
|---|---|---|---|
| 3,273,807 A | | 9/1966 | Wright |
| 3,322,748 A | | 5/1967 | Tokimatsu et al. |
| 3,857,833 A | | 12/1974 | Warzecha et al. |
| 4,117,223 A | | 9/1978 | Lodige et al. |
| 4,254,258 A | * | 3/1981 | Durso ............................. 536/98 |
| 4,339,573 A | | 7/1982 | Wust et al. |
| 4,460,766 A | | 7/1984 | Felcht et al. |
| 6,884,883 B1 | * | 4/2005 | Shima et al. ..................... 536/56 |
| 2002/0099203 A1 | * | 7/2002 | Kobayashi ....................... 536/84 |

FOREIGN PATENT DOCUMENTS

| | | | |
|---|---|---|---|
| DE | 838593 C | | 5/1952 |
| DE | 264001 A1 | | 1/1989 |
| GB | 1331243 A | | 9/1973 |
| GB | 1493 321 A | | 11/1977 |
| JP | 37-018650 B | | 12/1937 |
| JP | 49-033109 B | | 9/1974 |
| JP | 53-041356 A | | 4/1978 |
| JP | 56-016501 A | | 2/1981 |
| JP | 58-103501 A | | 6/1983 |
| JP | 58-147401 A | | 9/1983 |
| JP | 02-225501 A | | 9/1990 |
| JP | 2001-302701 A | | 10/2001 |
| JP | 2001302701 A | * | 10/2001 |
| JP | 2002-003501 A | | 1/2002 |

OTHER PUBLICATIONS

European Search Report (3 pages) for corresponding European Application No. EP06252932.6; Mailing Date: Jul. 31, 2008.
Funken Co., Ltd. "Powder-Wetting Continuous Spray Mixer: Flow Jet Mixer MW-J", *Kikai Shinkou* 8(2):52-53 (1975).
Iwako et al. "Automatic and Continuous Process of Mixing or Kneading", *J. Japan Soc. of Color Material* 51(5):302-308 (1978).
Japanese Office Action corresponding to Japanese Patent Application No. 2005-176286 dated Dec. 21, 2010.

\* cited by examiner

*Primary Examiner* — Shaojia Anna Jiang
*Assistant Examiner* — Ganapathy Krishnan
(74) *Attorney, Agent, or Firm* — Myers Bigel Sibley & Sajovec, PA

(57) ABSTRACT

Provided is a method for preparing alkali cellulose having alkali distributed uniformly therein. A uniform alkali distribution in the alkali cellulose makes it possible to prepare cellulose ether which has been substituted uniformly in an etherification reaction step. The resulting cellulose ether does not contain a floating water-insoluble portion which will otherwise appear owing to insufficient substitution. More specifically, provided are a method for preparing alkali cellulose, comprising simultaneously feeding pulp powder and an aqueous alkali solution to a high speed disperser to continuously bring them into contact with each other and a method for preparing cellulose ether, comprising reacting the resulting alkali cellulose with an etherifying agent.

4 Claims, No Drawings

METHODS FOR PREPARING ALKALI CELLULOSE AND CELLULOSE ETHER

RELATED APPLICATIONS

This application claims priority from Japanese Patent Application No. 2005-176286; filed Jun. 16, 2005, the disclosures of which is incorporated herein by reference in its entirety.

BACKGROUND OF THE INVENTION

1. Field of the Invention

The present invention relates to methods for preparing alkali cellulose and cellulose ether.

2. Description of the Related Art

For the preparation of cellulose ether, known is a method comprising steps of bringing an aqueous alkali solution into contact with highly purified pulp to prepare alkali cellulose and etherifying the resulting alkali cellulose with an etherifying agent. Although the cellulose ether obtained as a final product becomes soluble in water by properly controlling the degree of substitution, a water insoluble portion existing in the solution sometimes lowers the transmittance of the aqueous solution or damages the commodity value of the cellulose ether as a contaminant.

The insoluble portion appears owing to the existence of a low substituted portion, that is, a portion not having enough substituent to permit dissolution of the cellulose ether in water. One of the causes of the insoluble portion is uneven alkali distribution in the alkali cellulose.

Roles which the alkali cellulose plays can include swelling the cellulose to change its crystal structure in the pulp, thereby promoting the penetration of the etherifying agent; catalyzing the etherification reaction with alkylene oxide; or serving as a reactant for an alkyl halide.

A portion of pulp not brought into contact with the aqueous alkali solution is not involved in a reaction and therefore remains as an insoluble portion. The uniformity of the alkali in alkali cellulose directly affects the amount of the insoluble portion.

According to a preparation method of alkali cellulose, pulp is dipped in an aqueous solution of sodium hydroxide to allow the pulp to sufficiently absorb the solution, and the resulting pulp is pressed to remove the excess alkali so as to leave a predetermined alkali amount.

This method is, however, disadvantageous from the standpoint of productivity because it needs cumbersome operations and in addition, the alkali amount cannot easily be adjusted to a predetermined value.

A method of adding a predetermined amount of alkali to the pulp powder obtained by pulverization, and then mixing them mechanically is excellent in productivity because this method facilitates control of the alkali concentration to a predetermined value and can be composed of one step. The mechanical mixing can include a batch process in which pulp powder and an aqueous solution of sodium hydroxide are charged in a double-shaft kneader. In this kneader type mixer, however, an increase in the mixed volume leads to a decrease in the contact area of an agitating blade with the mixture, thereby the mixing ability being lowered. Moreover, it requires a lot of time to obtain a relatively uniform mixture and the scale of the equipment must inevitably be enlarged.

In a mixer equipped with a proshear agitating blade and a chopper, an increase in the equipment size makes it difficult for the chopper to apply a shear force to a mixture as in the above-described kneader so that a mixture uneven at the micro level is produced. In addition, the mixer has to be large in the size and imposes a heavy burden from the viewpoints of space and cost.

The mixer with a proshear agitating blade has two types, that is, a batch type and a continuous type. A back flow of the mixture from the outlet of alkali cellulose to the inlet of pulp cannot be prevented completely and the mixture containing an uneven portion is sometimes discharged. In such mechanical mixing, it is difficult to obtain a uniform mixture, in a true sense, of cotton-like powdered pulp and a relatively small amount of an alkali. The cellulose ether prepared from such alkali cellulose inevitably contains a larger amount of an undissolved portion compared with that prepared by the above-described dipping method.

For improving the uniformity of alkali, an increase in the volume of an aqueous alkali solution by using a dilute aqueous alkali solution was investigated. However, it is not preferred because in the subsequent etherification reaction, water in the reaction system causes an undesirable side reaction with an etherifying agent and markedly decreases the efficiency of primary reaction between the etherifying agent and the cellulose. Removal of water prior to the etherification reaction-is possible, but unpractical because a vapor pressure of the aqueous alkali solution is very low compared with that of water.

Another possible method is that of increasing the volume of a mixture of an aqueous alkali solution and alcohol by using a lower primary alcohol having compatibility with the aqueous alkali solution as described in Japanese Patent No. 132579. This method requires removal of the lower primary alcohol prior to the etherification reaction because of a side reaction between the alcohol with the etherifying agent.

A method for improving the uniformity of alkali cellulose even when the above-described mixer or a vertical mixer equipped with a simple agitating blade is employed has been investigated, the method comprising use of a large amount of an inactive dispersant such as dimethoxyethane or dimethyl ether (Japanese Patent Application Unexamined Publication Nos. 56-16501/1981 and 58-103501/1983). However, this method requires, after the preparation of alkali cellulose, removal of this dispersant prior to the etherification reaction or during purification after the reaction. The removal makes the method cumbersome and inevitably raises the production cost.

In Japanese Patent Application Unexamined Publication No. 2001-302701, proposed is a method of using alkali cellulose which has been prepared by continuously feeding pulp powder, which has been obtained by pulverizing pulp, to a double-shaft kneader and mixing the pulp powder with an aqueous alkali solution fed simultaneously and continuously from the same feed port or another position. Even in this method, however, the conditions under which the pulp powder and the aqueous alkali solution are mixed are not constant. The concentration of the aqueous alkali solution changes by adding the pulp powder thereto. Thus, such two reactants, which have encountered at an uneven concentration, are forcibly mixed in the double-shaft kneader so that the alkali concentration does not become completely uniform in the pulp powder.

SUMMARY OF THE INVENTION

An object of the present invention is to provide a preparation method of alkali cellulose having alkali distributed uniformly therein.

In addition, a uniform alkali distribution in the alkali cellulose makes it possible to prepare cellulose ether which has been uniformly substituted in an etherification reaction step. Consequently, the cellulose ether prepared does not contain a floating water-insoluble portion, that is, a portion which has remained undissolved in water owing to insufficient substitution.

According to the present invention, pulp powder obtained by pulverizing pulp is fed to a high speed disperser and mixed with the aqueous alkaline solution which is simultaneously fed thereto through the same inlet port or through another position. The resulting mixture is continuously discharged from an outlet port.

The feed rate of the pulp powder can be controlled by a volumetric feeder so that the pulp powder can be fed at a desired flow rate. The feed rate of the aqueous alkaline solution can be controlled by a metering pump so that the solution can be fed to generate a predetermined alkali concentration.

Although the aqueous alkaline solution may be fed through the common inlet port to the powdered pulp, it may be preferable to feed the aqueous alkaline solution through another inlet port located immediately after the inlet port for the powdered pulp so as to prevent a lump formed by them from blocking the inlet port therewith.

More specifically, the present invention provides a method for preparing alkali cellulose, comprising simultaneously feeding pulp powder and an aqueous alkali solution to a high-speed disperser to continuously bring them into contact. The present invention also provides a method for preparing cellulose ether, comprising reacting the resulting alkali cellulose with an etherifying agent.

The alkali cellulose obtainable by the preparation method of the present invention can exhibit a very uniform alkali distribution therein. Cellulose ether such as methyl cellulose (MC) prepared using this alkali cellulose can be excellent in solubility.

In addition, the alkali cellulose obtainable by the preparation method of the present invention can have high bulk density so that in a subsequent etherification step, a large amount of the alkali cellulose can be charged in a smaller reaction vessel, leading to high productivity.

DETAILED DESCRIPTION OF THE PREFERRED EMBODIMENT(S)

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

The high-speed disperser to be used in the present invention may be preferably a dispenser capable of stirring powder at a peripheral speed as high as 5 m/s or greater and creating a uniform dispersion state after the powder is fed to a mixing vessel.

Examples of the agitating blade may include a cylinder type with a pin, a cone type with a pin, a disc type with a pin, a cylinder type with a scraping blade and a disc type with a scraping blade.

The dwell time for subjecting to agitation may be preferably from 0.1 to 20 seconds.

A feed ratio, by weight, of the aqueous alkali solution to pulp (aqueous alkali solution/pulp) may be preferably from 0.5 to 4.0, especially preferably from 1.0 to 3.0. When the amount of the aqueous alkali solution is smaller than the above range, preparation of a uniform mixture may be disturbed. When the amount of the aqueous alkali solution is larger than the above range, the efficiency of the etherifying agent may be lowered when the etherification reaction is performed later.

The temperature of the aqueous alkali solution may be preferably from 10 to 80° C., especially preferably from 15 to 60° C. At temperatures lower than 10° C., a uniform mixture may not be obtained owing to an excessive increase in the viscosity. At temperatures greater than 80° C., the polymerization degree may be reduced.

Examples of such a high-speed disperser may include a flow jet mixer by Funken Powertechs Co., Ltd. and a microspeed mixer by Takara Koki Co., Ltd.

The pulp may be continuously fed to the high-speed disperser from an inlet port, typically by the aid of a screw. "Funken Auto feeder" by Funken Powertechs Co., Ltd., a circle feeder or a vibration feeder which is designed as a constant feeder can be used in order to keep a flow rate as constant as possible. The pulp can be fed to the high-speed disperser under conditions permitting simultaneous contact with the alkali aqueous solution continuously fed to the disperser.

A main body of the disperser may preferably have a jacket through which water flows so that the heat generated by mixing the alkali with the pulp powder can be controlled so as to control the internal temperature.

When oxygen exists, the disperser may preferably have a structure permitting replacement of the atmosphere with vacuum or nitrogen in order to prevent a reduction in the degree of polymerization of the alkali cellulose.

When it is desired to control the degree of polymerization in the presence of oxygen, the disperser may preferably have a structure permitting the control of an oxygen amount.

No limitation is imposed on the aqueous alkali solution to be used in the present invention insofar as it can produce alkali cellulose. It may be preferably selected from the group consisting of an aqueous solution of sodium hydroxide and an aqueous solution of potassium hydroxide. The use of sodium hydroxide may be especially preferred for an economical reason. Although the concentration of the aqueous alkali solution may be typically from 23 to 60% by weight, a concentration in the vicinity of from 35 to 55% by weight may be more preferable in consideration of the subsequent etherification reaction and the handling of the aqueous solution.

In the present invention, the uniformity of the alkali can be improved basically without using a lower primary alcohol or the other inert solvent. However, the lower primary alcohol or the other inert solvent may be used in a system using such a solvent in combination. Such a solvent can also be used in order to improve the uniformity of alkali and the bulk density of alkali cellulose in the system using solvents in combination.

Moreover, a continuous process can be adopted as the method of the present invention so that the present invention is advantageous from the viewpoint of space saving because the size of the apparatus can be made smaller than that adopted in a batch process.

Cellulose ether can be prepared in a known manner by using the alkali cellulose obtained by the above preparation method as a raw material.

As the reaction method, a batch process or a continuous process can be employed. Since the alkali cellulose of the present invention may be prepared by a continuous process, a continuous reaction process may be more preferable although a batch process may be employed without any problem.

In a batch process, the alkali cellulose discharged from the high speed disperser may be stored in a buffer tank, or may be directly transferred into an etherification reaction vessel. Higher productivity may be achieved by charging the alkali cellulose in an etherification reaction vessel soon after storing it in a buffer tank in order to reduce the occupancy time in the etherification reaction vessel.

In order to suppress a reduction in the polymerization degree, the buffer tank having an oxygen-free atmosphere by vacuum or nitrogen replacement may be preferable.

Examples of the cellulose ether obtainable from the alkali cellulose as a starting material may include methyl cellulose, ethyl cellulose (EC), hydroxyethyl cellulose (HEC) and hydroxypropyl cellulose (HPC), as well as mixed cellulose ether such as hydroxyethyl methyl cellulose (HEMC), hydroxypropyl methyl cellulose (HPMC) and carboxymethyl cellulose (CMC).

Examples of the etherifying agent may include alkyl halide such as methyl chloride and ethyl chloride, alkylene oxide such as ethylene oxide and propylene oxide, and monochloroacetic acid.

The present invention will hereinafter be described in Examples and Comparative Examples. However, it should not be construed that the present invention is limited to or by these Examples.

EXAMPLE 1

The 10.2 kg of pulp powder (water content: 4.0 wt %) obtained by pulverizing highly pure dissolving pulp derived from wood was fed at a constant rate of 36 kg/hr from an auto feeder ("FS-Q2-S", trade name; product of Funken Powertechs, Co., Ltd.) into a high speed disperser "Flow Jet Mixer MW-F-300-X" (trade name; product of Funken Powertechs Co., Ltd.). At the same time, 24.5 kg of a 49 wt % aqueous solution of sodium hydroxide was fed by a diaphragm pump at a constant rate of 86.5 kg/hr from an inlet port disposed in the vicinity of the pulp feed port, whereby an alkali cellulose was prepared. Of the alkali cellulose thus obtained, a 22.7 kg portion was placed in a 100-liter proshear type autoclave equipped with an internal agitator. After pressure was reduced to −97 kPa, the pressure was raised back to atmospheric pressure, followed by pressure reduction to −97 kPa again. The 2.8 kg of dimethyl ether and then 14.3 kg of methyl chloride and 3.5 kg of propylene oxide were added in the autoclave. The reaction was carried out at an internal temperature of 66° C. for 2 hours. The temperature was then raised and kept at 90° C. for 30 minutes, whereby the etherification reaction was completed.

The reaction product was washed with hot water, and dried. The physical properties of the resulting HPMC are shown in Table 1.

COMPARATIVE EXAMPLE 1

In a 100-liter proshear mixer was charged 7 kg of the pulp powder same as that of Example 1. Under the conditions of main agitation at 200 rpm, chopper at 1500 rpm and jacket temperature of 20° C., 15.7 kg of a 49 wt % aqueous solution of sodium hydroxide was fed to the mixer over 10 minutes. After stirring was continued for further 10 minutes, the resulting mixture was discharged. In the same manner to Example 1, 22.7 kg of the resulting alkali cellulose produced HPMC. The physical properties of HPMC are shown in Table 1.

EXAMPLE 2

In the same manner to Example 1 except for use of pulp powder (water content: 3.0 wt %) obtained from wood pulp having a lower polymerization degree than that of the wood pulp used in Example 1, alkali cellulose was prepared.

In the same manner to Example 1 except that not propylene oxide but only methyl chloride was added. The etherification reaction was carried out for 2 hours at the internal temperature adjusted to 60° C., and then the temperature was raised and kept at 90° C. for 30 minutes to complete the etherification reaction. Consequently, methyl cellulose (MC) was obtained.

The reaction product was washed with hot water and dried. The physical properties of the resulting MC are shown in Table 1.

COMPARATIVE EXAMPLE 2

In the same manner to Comparative Example 1 except for use of pulp powder same as that in Example 2, an alkali cellulose was prepared. Then, in the same manner to Example 2, MC was obtained. The physical properties of MC are shown in Table 1.

COMPARATIVE EXAMPLE 3

Pulp powder same as that in Example 1 was fed to a double-shaft kneader (paddle diameter: 25 mm φ, rotation speed: 100 rpm) at a constant rate of 10 g/min. At the same time, a 40 wt % aqueous solution of sodium hydroxide was fed to the kneader at a rate of 24.0 g/min. Of the alkali cellulose thus obtained, a 22.7 kg portion was used and in the same manner as Example 1, HPMC was obtained. The physical properties of HPMC are shown in Table 1.

COMPARATIVE EXAMPLE 4

Pulp powder same as that in Example 2 was fed to a double-shaft kneader (paddle diameter: 25 mm φ, rotation speed: 100 rpm) at a constant rate of 10 g/min. At the same time, a 49 wt % aqueous solution of sodium hydroxide was fed to the kneader at a rate of 24.0 g/min. Of the alkali cellulose thus obtained, a 22.7 kg portion was used and in the same manner as Example 1, MC was obtained. The physical properties of MC are shown in Table 1.

TABLE 1

|  | Viscosity of 2 wt % cellulose ether solution (mPa·s) | Degree of substitution of cellulose ether | | Transmittance of solution | | Insoluble matter having a size of 8 to 200 μm at 5° C.* |
| --- | --- | --- | --- | --- | --- | --- |
|  |  | methoxyl (%) | Hydroxypropoxyl (%) | 5° C. (%) | 30° C. (%) |  |
| Example 1 | 5500 | 28.9 | 9.1 | 96.0 | 92.0 | 230 |
| Example 2 | 400 | 29.4 | — | 97.6 | — | 300 |
| Comp. Ex. 1 | 5400 | 28.1 | 9.1 | 70.5 | 30.0 | 2700 |
| Comp. Ex. 2 | 130 | 29.4 | — | 82.0 | — | 2900 |
| Comp. Ex. 3 | 5200 | 28.3 | 9.1 | 71.0 | 30.5 | 2600 |
| Comp. Ex. 4 | 120 | 29.3 | — | 82.5 | — | 2850 |

*The number of undissolved substances having from 8 to 200 μm in size in 2 ml of a 0.2 wt % solution of cellulose ether, which had been obtained by dissolving the cellulose ether in an exclusive electrolyte solution (ISOTON II) cooled to 5° C., was counted using a Coulter Counter (product of Beckman Coulter Co., Ltd.).

In Table 1, "viscosity of 2 wt % cellulose ether solution" was determined by dispersing a sample in hot water for 30 minutes so as to yield a 2 wt % aqueous solution, stirring the dispersion in a bath of 5° C. for 1 hour to dissolve the sample, adjusting the temperature of the resulting solution to 20° C., and measuring its viscosity with a Brookfield rotational viscometer.

"Degree of substitution (with) methoxyl (group)" and "Degree of substitution (with) hydroxypropoxyl (group)" were determined by the method described in the Japanese Pharmacopoeia.

"Transmittance of solution (at) 5° C." was a transmittance at 5° C. by white light of a 2 wt % aqueous solution prepared by dissolving a sample at 5° C. with the proviso that a transmittance of pure water is set at 100%.

"Transmittance of solution (at) 30° C." was transmittance at 30° C. by white light of a 2 wt % aqueous solution prepared by dissolving a sample at 30° C. with the proviso that a transmittance of pure water is set at 100%.

"Insoluble matter having a size of from 8 to 200 μm at 5° C." was determined by counting the number of undissolved substances having a size of from 8 to 200 μm in 2 ml of the solution by a Coulter counter of Beckman Coulter Co., Ltd.

The invention claimed is:

1. A method for preparing cellulose ether, comprising simultaneously feeding pulp powder and an aqueous alkali solution to a high speed disperser to continuously bring them into contact with each other to obtain alkali cellulose, wherein the high speed disperser comprises an agitating blade selected from the group consisting of a cylinder type with a pin, a cone type with a pin, a disc type with a pin, a cylinder type with a scraping blade and a disc type with a scraping blade, and stirs at a peripheral speed of 5 m/s or greater, and reacting the alkali cellulose with an etherifying agent;
wherein the cellulose ether is selected from the group consisting of methyl cellulose (MC), ethyl cellulose (EC), hydroxyethyl cellulose (HEC), hydroxypropyl cellulose (HPC), hydroxyethyl methyl cellulose (HEMC), and hydroxypropyl methyl cellulose (HPMC).

2. The method for preparing cellulose ether according to claim 1, wherein said feeding has a weight ratio of the aqueous alkali solution to the pulp of 0.5 to 4.0.

3. The method for preparing cellulose ether according to claim 1, wherein a 2% aqueous solution of said cellulose ether has a transmittance of at least about 92% relative to the transmittance of pure water.

4. The method for preparing cellulose ether according to claim 1, wherein said cellulose ether has less than about 300 particles insoluble matter of 8-200 μm size/2 ml of an 0.2 wt % solution of said cellulose ether.

* * * * *